United States Patent
Davis

[11] Patent Number: 5,542,694
[45] Date of Patent: Aug. 6, 1996

[54] THERMOPLASTIC AIR BAG COVER HAVING A UNITARY MULTIFUNCTIONAL DOMED SWITCHING MODULE

[75] Inventor: David J. Davis, 6771 Serenity, Troy, Mich. 48098

[73] Assignee: Larry J. Winget, Leonard, Mich.

[21] Appl. No.: 451,452

[22] Filed: May 26, 1995

[51] Int. Cl.⁶ .................................................. B60R 21/20
[52] U.S. Cl. ...................... 280/728.3; 280/731; 200/61.54
[58] Field of Search ................................ 280/728.3, 731, 280/728.1; 200/61.54, 61.55, 61.56, 61.57

[56] References Cited

U.S. PATENT DOCUMENTS

| | | | |
|---|---|---|---|
| 4,421,960 | 12/1983 | Arima et al. | 200/61.54 |
| 4,604,912 | 8/1986 | Sugita et al. | 200/61.54 |
| 4,720,610 | 1/1988 | MacHarrie | 200/5 A |
| 4,934,735 | 6/1990 | Embach | 280/731 |
| 5,002,306 | 3/1991 | Hiramitsu et al. | 280/731 |
| 5,062,661 | 11/1991 | Winget | 280/731 |
| 5,085,461 | 2/1992 | Shibata | 280/731 |
| 5,294,147 | 3/1994 | Edge | 280/728.3 |
| 5,303,952 | 4/1994 | Shermetaro et al. | 280/731 |
| 5,369,232 | 11/1994 | Leonelli | 280/731 |
| 5,465,998 | 11/1995 | Davis | 200/61.54 |

FOREIGN PATENT DOCUMENTS 57-198140  12/1982  Japan .................................. 200/61.54

*Primary Examiner*—Anne Marie Boehler
*Assistant Examiner*—Peter C. English
*Attorney, Agent, or Firm*—Brooks & Kushman P.C.

[57] ABSTRACT

A thermoplastic air bag cover having a unitary multifunctional domed switching module is provided wherein the domes are integrally formed with a front plate of the switching module to seal and protect switches of the switching module. The domes extend through a window formed in a front panel of the cover and the domes include indicia formed on outer surfaces thereof to indicate a particular automotive vehicle accessory and its function to be controlled thereby. In one embodiment, a membrane-type horn switch is coupled to the unitary switching module at a rear inner surface of the front panel. Both the unitary switching module and the membrane-type horn switch are secured at an inner surface of the front panel of the air bag cover by first and second coupled back plates.

10 Claims, 3 Drawing Sheets

би5,542,694

THERMOPLASTIC AIR BAG COVER HAVING A UNITARY MULTIFUNCTIONAL DOMED SWITCHING MODULE

CROSS-REFERENCE TO RELATED APPLICATION

This invention is related to U.S. patent application Ser. No. 08/407,925, filed Mar. 21, 1995, entitled "Air Bag Cover Having A Switch Assembly Disposed Therein". This invention is also related to U.S. patent application Ser. No. 08/458,882, filed Jun. 2, 1995 entitled "Thermoplastic Air Bag Cover Having A Membrane Switch". This invention further relates to U.S. patent application Ser. No. 08/451, 458, filed May 26, 1995 entitled "Thermoplastic Air Bag Cover Having A Domed Front Panel And Unitary Multifunctional Switching Module".

TECHNICAL FIELD

This invention relates to plastic air bag covers having switch assemblies therein and, in particular, to such covers which are affixable to air bag containers.

BSCKGROUND ART

Presently, when air bag covers are provided in automobiles on the driver's side of the vehicle, the air bag is stored in the steering column behind an air bag cover. During automatic inflation of the air bag, the air bag cover moves away from the steering column to permit its safety function between the steering column and the operator of the vehicle.

A recent practice in the automotive industry is utilization of all plastic fabricated air bag covers. Conventional air bag covers used in conjunction with occupant restraint systems often include various connection systems for attaching the air bag cover to the uninflated air bag container.

The U.S. patent to Winget, 5,062,661, discloses a rigid plate attached to a substantially rigid remainder of a front panel of an air bag cover to define a hollow compartment which, together, move upon manual actuation of a flexible manually operable diaphragm at the front surface of the front panel. Upon separation from the side panel, the front panel, including the diaphragm, the hollow compartment, and a rigid plate move together to permit the inflating air bag to leave the cover. The front panel has a first electrically conductive inner surface for making a circuit path with a corresponding second electrically connected inner surface of the rigid plate.

It is desirable to have an air bag cover including a hidden membrane switch device which has multiple functions in addition to being a horn switch, such as controls for a radio, the climate control system, the cruise control system, a telephone, and the like.

The U.S. patent to Shermetaro et al., 5,303,952, discloses a horn switch device which is capable of performing multiple functions in addition to being a horn switch, such as controls for cruise control, radio controls, and the like.

The U.S. patent to Hiramitsu et al., 5,002,306, discloses a plurality of membrane switches and a membrane switch group on the upper surface of the upper wall of a pad. The membrane switches may also be arranged at the inner surface of the upper wall, thereby hiding the switches. The membrane switch group comprises four membrane switches separate from the membrane switches to control such items as auto-drive, air conditioning, a radio and a telephone, or the like.

U.S. Pat. No. 5,085,461 discloses control switches for an air conditioner and control switches for an audio device such as a radio. The switches project from the front surface of the air bag cover therethrough.

The U.S. patent to MacHarrie, 4,720,610, discloses a keyboard matrix switch including a membrane layer having dimples therein at each key switch site to provide tactile feed upon actuation. Each dimple is provided with a series of ribs formed in the membrane layer and which radiate outwardly from the dimple to preclude overtravel and locking of the dimple in an inverted position.

There are numerous problems associated with prior art air bag covers having switches incorporated therein. Consequently, it is desirable to provide an air bag cover having multifunctional switches incorporated therein which is simple, reliable, is economic to manufacture, easy to assemble and test as is necessary.

SUMMARY OF THE INVENTION

An object of the present invention is to provide an air bag cover having a domed unitary switching module incorporated therein which is relatively simple and reliable, economic to manufacture, and easily assembled and tested.

Another object of the present invention is to provide an air bag cover which has a domed unitary switch module incorporated therein so that the air bag cover can be customized (to change functions and/or accessories, which are to be controlled) by merely changing indicia on the switching module.

In carrying the above objects and other objects of the present invention, a relatively flexible thermoplastic air bag cover is provided. The air bag cover includes a front panel adapted to overlie an undeployed air bag. The front panel has a front outer surface and a rear inner surface and is separable along the prescribed tear pattern upon deployment of the air bag. The front panel has a window extending completely therethrough between the front outer surface and the rear inner surface of the front panel. The air bag cover also includes a unitary switching module adapted to be electrically coupled to a set of electrical accessories of a motor vehicle. The switching module has a base plate and a plurality of switches mounted on the base plate. The switching module also has a front plate secured to the base plate which has a plurality of raised domes molded thereon to form a plurality of hollow compartments for the respective plurality of switches. The raised domes define a set of switch activating means extending through the window above the outer surface of the front panel in a switch activation area of the front panel. A first back plate is secured to the rear inner surface of the front panel in containing relationship to the unitary switching module and forms a first hollow compartment for the unitary switching module in the switch activation area. Each switch is activated by depression of its respective raised dome on the front plate of the unitary switching module.

Preferably, the air bag cover also includes a membrane-type horn switch lying behind the rear inner surface in a horn switch activation area of the front panel and a second back plate secured to the rear inner surface of the front panel in containing relationship to the membrane-type horn switch and forming a second hollow compartment for the membrane-type horn switch in the horn switch activation area.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
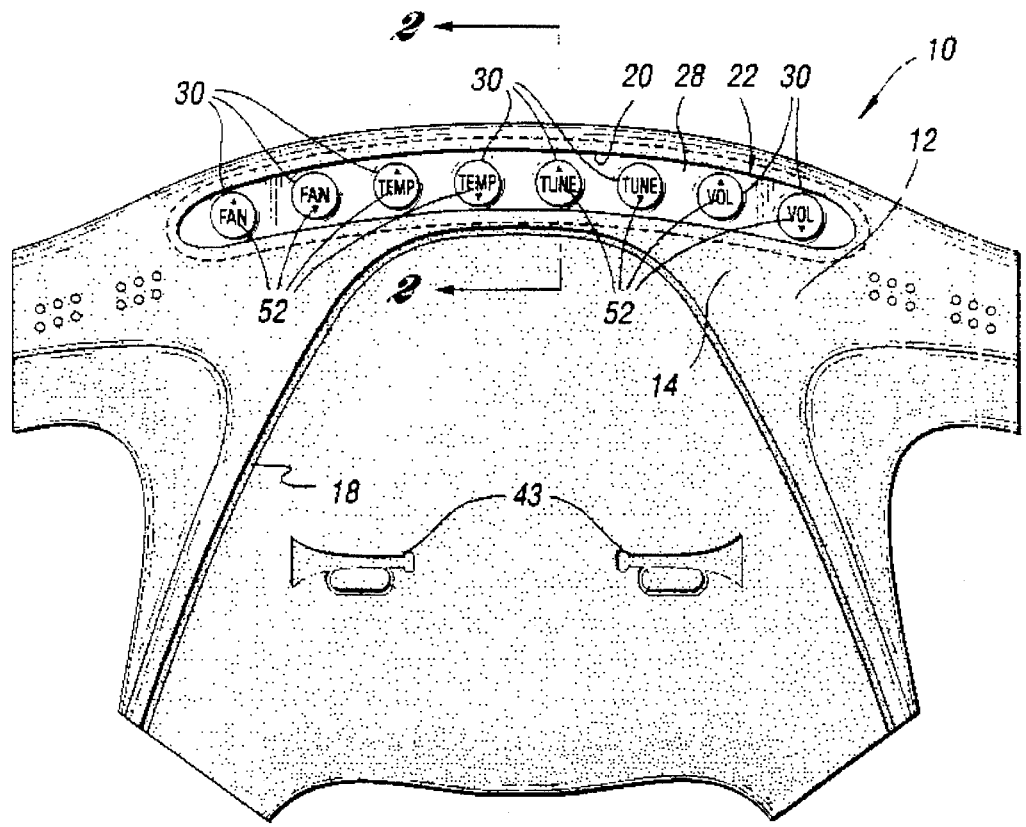
FIG. 1 is a front elevational view of an air bag cover constructed in accordance with the present invention.

Referring now to the drawing Figures, there is illustrated in FIGS. 1–7 different embodiments of an automotive air bag cover constructed in accordance with the present invention. Typically, the automotive air bag cover is adapted to be secured at the top end of the vehicle drive column (not shown) at the steering wheel of the vehicle.

Each of the air bag covers is preferably a relatively flexible thermoplastic air bag cover formed by injection molding with a thermoplastic such as Santoprene® (a trademark of Monsanto Co.)

Referring now to FIG. 1, an air bag cover, generally indicated at 10, includes a front panel 12 overlying an undeployed air bag (not shown). The front panel 12 has a front outer surface 14 and a rear inner surface 16. The front panel 12 is separable along a prescribed tear pattern 18 upon deployment of the air bag. The front panel 12 also has an elongated window 20 extending completely therethrough between the front outer surface 14 and the rear inner surface 16 at a top portion of the front panel 12 outside an area defined by the tear pattern 18. The location of the window 20 in the front panel may vary depending on the styling and ergonomics of the cover 10.

The cover 10 also includes a unitary switching module, generally indicated at 22, which lies behind the rear inner surface 16 in a first switch activation area of the front panel 12. The unitary switching module 22 is adapted to be electrically coupled to a set of electrical accessories of a motor vehicle such as a radio and climate control system of the motor vehicle. The unitary switching module 22 may comprise a rigid insulative material such as an injection molded plastic with the electrical circuitry comprising a metal stamping or the like embedded in the insulative material such as by insert molding. In an alternative embodiment, the electrical circuitry may comprise a thin electrically conductive leaf coated with a flexible electrically insulative coating such as a flexible plastic. The switching module 22 is obtainable from the Bergquist Company of Edina, Minn.

The unitary switching module 22 includes a plurality of switches 24 mounted on a base plate 26. The switches 24 may be any of a variety of known miniature switches such as dome switches, thin film switches such as force sensing resistors, piezoelectric elements, conductive inks, pressure sensitive electrically conductive adhesives, and the like.

The switching module 22 also includes a front plate 28 secured to the base plate 26 and having a plurality of raised domes 30 molded into the front plate 28 which define a first set of switch actuating mechanisms which are aligned with and extend through the window 20 above the front outer surface 14 of the front panel 12. The base plate 26 and the raised domes 30 form sealed hollow compartments for the switches 24.

Figure 2:
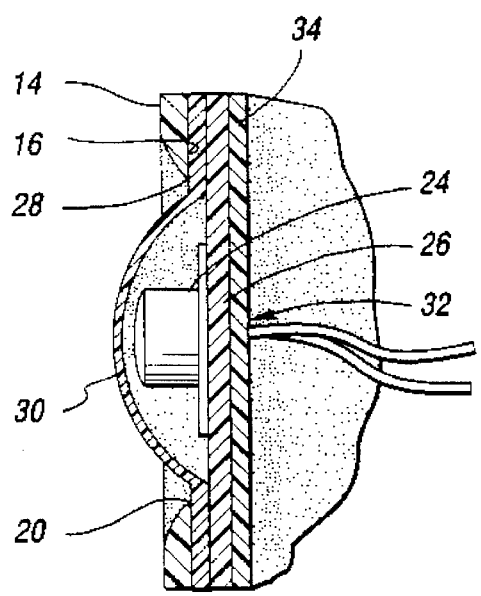
FIG. 2 is a sectional view of the air bag cover of FIG. 1 taken along lines 2—2 of FIG. 1.

With reference to FIG. 2, the switch 24 is actuable by depression of its respective raised dome 30 on the front outer surface 14 of the front panel 12. Actuation of the raised dome 30 engages a raised dome portion of the switch 24.

Figure 3:
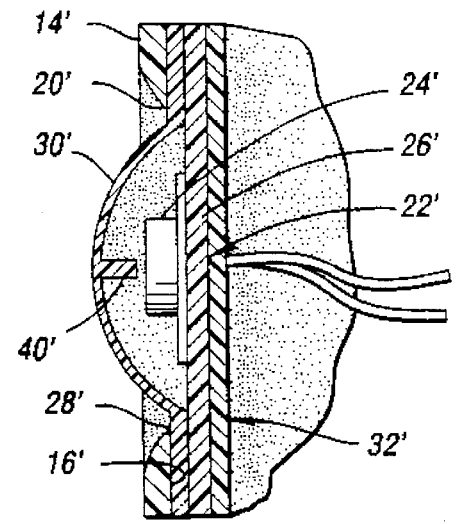
FIG. 3 is a view similar to FIG. 2 illustrating a second embodiment of a unitary switching module of the present invention.

Referring now to FIG. 3, there is illustrated a second embodiment of a domed unitary switching module, generally indicated at 22'. The switching module 22' includes a raised dome 30' having an integrally formed plunger portion 40' extending toward its respective switch 24' which is not of a domed consideration like the switch 24 of FIG. 2. In this way, the actuation of the switch 24' of FIG. 3 does not require the extended amount of inward movement of the raised dome 30'. Parts illustrated in FIG. 3 which have the same or similar structure and/or function as the parts of FIG. 2 have a single prime designation and the same reference numeral.

Figure 4:
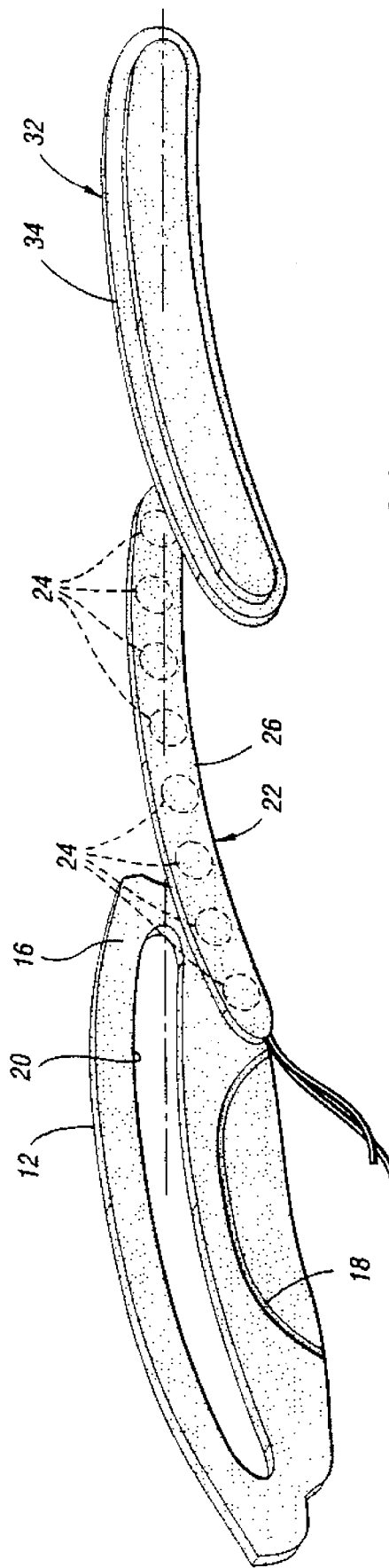
FIG. 4 is a rear exploded view, partially broken away, of the air bag cover of FIG. 1 and illustrating a first mechanism for securing the unitary switching module at the rear inner surface thereof.
Figure 5:
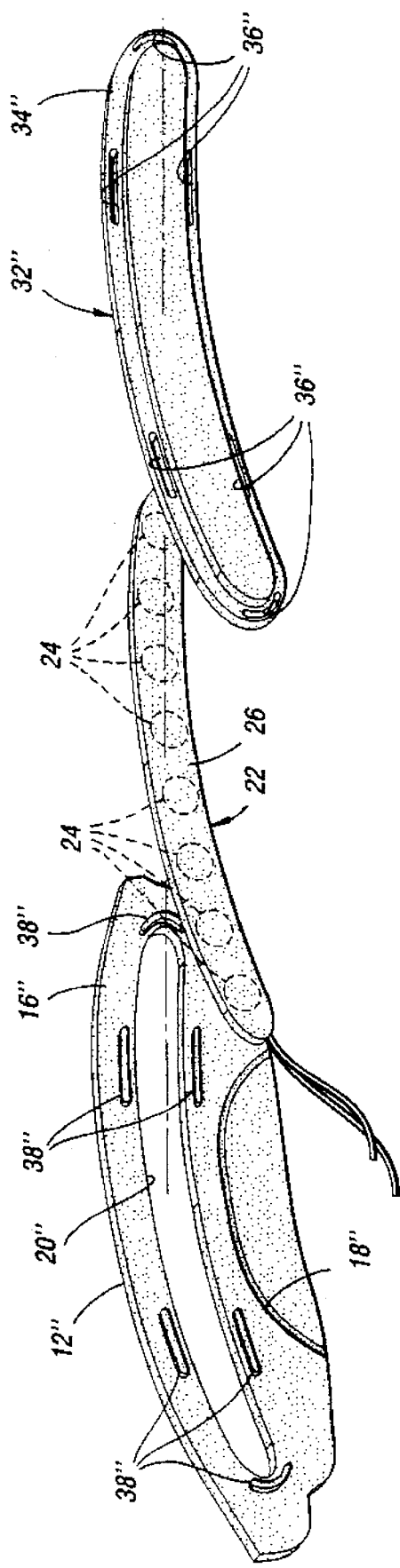
FIG. 5 is a view similar to FIG. 4 illustrating a second mechanism for securing the unitary switching module at the rear inner surface of the front panel.

Referring now specifically to FIGS. 4 and 5, there is illustrated first and second embodiments of first back plates, generally indicated at 32 and 32", respectively. Each of the back plates 32 and 32" is secured to its inner surface 16 or 16" of its front panel 12 or 12" by attachment or rim portions 34 and 34". The back plates 32 and 32" are in containing relationship to their respective unitary switching modules 22 to form hollow compartments for their unitary switching modules 22 in the switch activation areas of their front panels 12 or 12".

With specific reference to FIG. 4, the attachment portion 34 of the back plate 32 is secured by being thermally bonded to the rear inner surface 16 of the front panel 12.

With specific reference to FIG. 5, the attachment portion 34" of the back plate 32" includes a plurality of apertures 36" formed therethrough for receiving retaining stakes 38" integrally formed and rearwardly extending on the rear inner surface 16" of the front panel 12".

Figure 6:
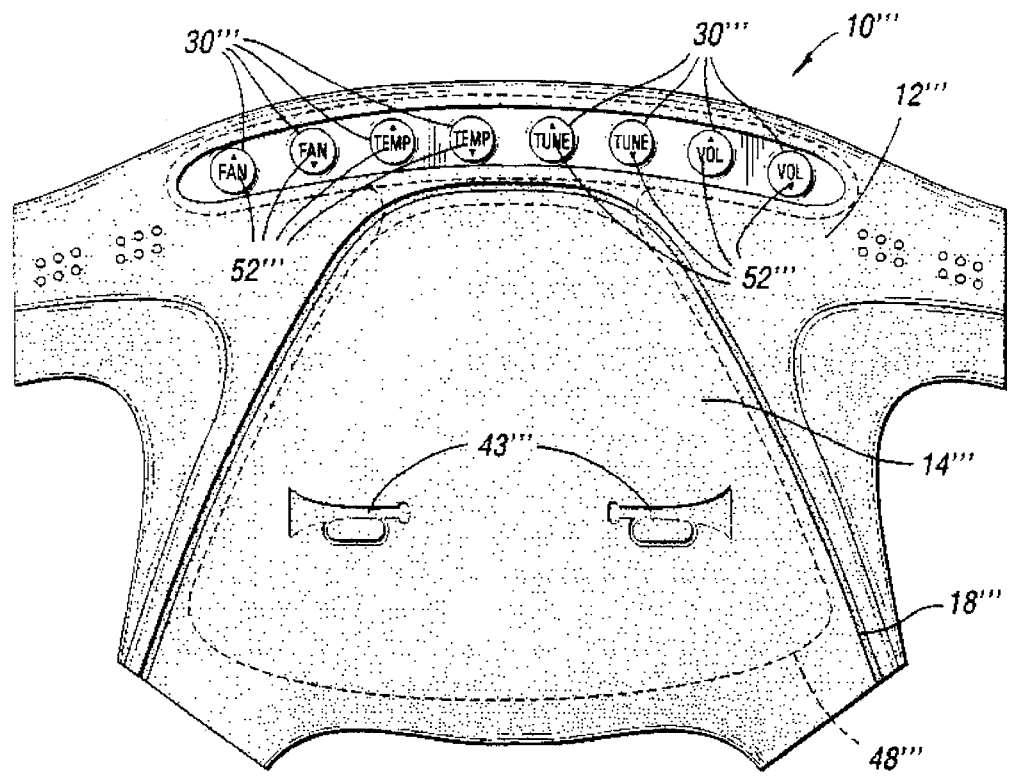
FIG. 6 is a view similar to the view of FIG. 1 illustrating a second embodiment of the air bag cover constructed in accordance with the present invention.
Figure 7:
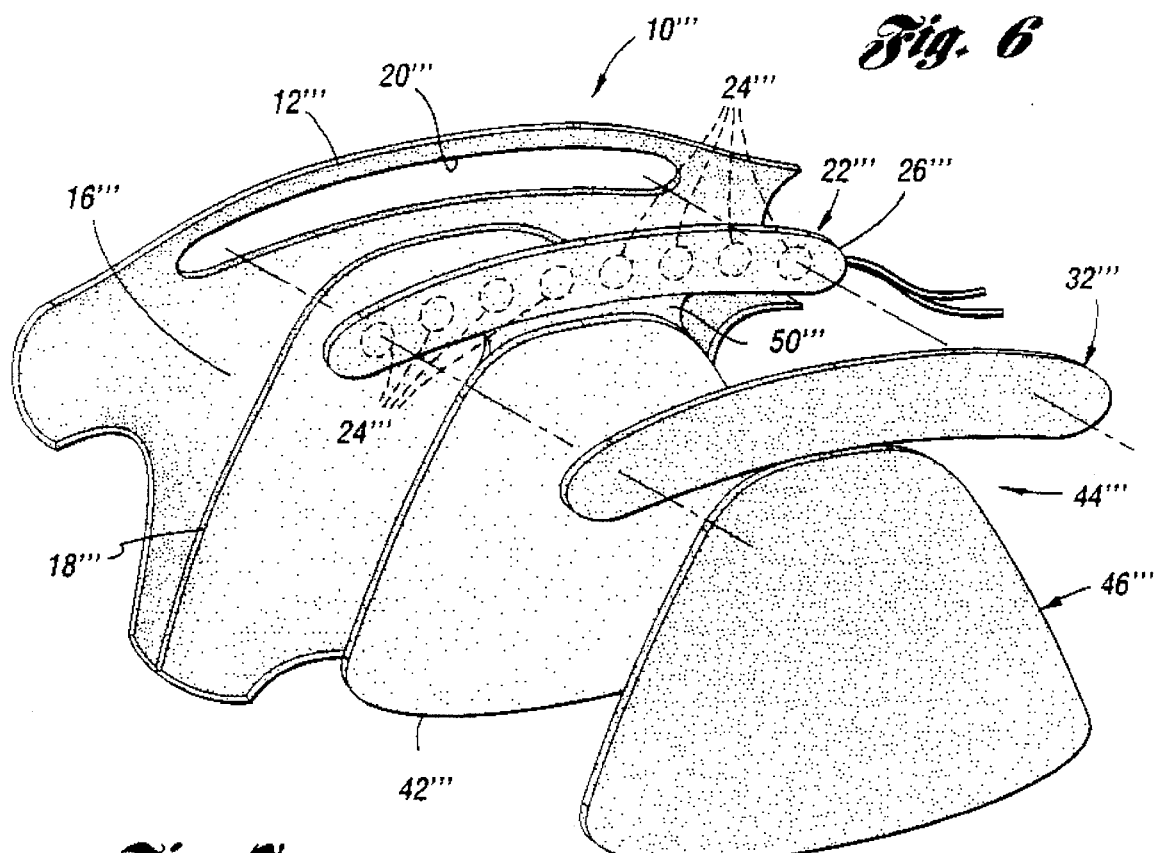
FIG. 7 is a rear exploded view of the air bag cover of FIG. 6.

Referring now to FIGS. 6 and 7, there is illustrated another embodiment of an air bag cover generally indicated at 10'". Parts illustrated in FIGS. 6 and 7 which have the same or similar structure and/or function as the parts of FIGS. 1, 2 and 4 have a triple prime designation and the same reference numeral.

The air bag cover 10'" is fashioned in much the same manner as in the first embodiment except the air bag cover 10'" further includes a membrane-type horn switch 42'" integrally formed with a unitary switching module 22'" and lying behind the rear inner surface 16'" of the front panel 12'"in a horn switch actuation area of the front panel 12'". The integral formation of the switching module 22'" with the horn switch 42'" makes it easy to assemble the air bag cover 10'". Preferably, a thin plastic strip 50'" couples the switching module 22'" and the horn switch 42'" together. The plastic strip 50'" tears upon deployment of the air bag.

The air bag cover 10'" also includes a unitary back plate unit, generally indicated at 44'", which includes a first plastic back plate, generally indicated at 32''', and a connected second plastic back plate, generally indicated at 46'''. The first back plate 32''' is thermally bonded to the rear inner surface 16''' of the front panel 12''' in containing relationship to the unitary switching module 22''' to form a hollow compartment for the unitary switching module 22''' in a switch activation area. The first and second back plates 32''' and 46''' are separable upon deployment of the air bag.

The second back plate 46''' is also thermally bonded to the inner surface 16''' of the front panel 12''' in containing relationship to the membrane-type horn switch 42''' to form a second hollow compartment for the horn switch 42''' in a horn switch activation area as indicated on the front outer surface 14''' of the front panel 12''' by indicia 43'''. The horn switch 42''' is actuable or activated by depressing any part of the outer surface 14''' of the front panel 12''' within the horn switch activation area defined by the dashed line 48''' in FIG. 6.

As illustrated in FIGS. 1 and 6 with respect to the embodiments of the air bag covers 10 and 10''' illustrated therein, each of the raised domes 30 and 30''', respectively, include visually perceptible indicia 52 and 52''' to identify an electrical accessory of the motor vehicle and how that electrical accessory is to be controlled. Upwardly pointing triangles indicate that a particular function is to increase whereas a downwardly pointing triangle is to indicate that the particular function is to decrease.

For example, the left-most four raised domes 30 in FIG. 1 are associated with the automobile's climate control system whereas the right-most four raised domes 30 are associated with the vehicle's radio. Of the left-most four raised domes 30, the first raised dome 30 indicates that a fan of the climate control system is to be increased whereas the second raised dome 30 indicates that the fan speed is to decrease.

While the best mode for carrying out the invention has been described in detail, those familiar with the art to which this invention relates will recognize various alternative designs and embodiments for practicing the invention as defined by the following claims.

What is claimed is:

1. A relatively flexible thermoplastic air bag cover comprising:

a front panel adapted to overlie an undeployed air bag, the front panel having a front outer surface and a rear inner surface and being separable along a predetermined tear pattern upon deployment of the air bag, the front panel having a window extending completely therethrough between the front outer surface and the rear inner surface;

a unitary switching module adapted to be electrically coupled to a set of electrical accessories of a motor vehicle, and including a base plate, a plurality of switches mounted on the base plate and a front plate secured to the base plate and having a plurality of raised domes molded in the front plate to form a plurality of hollow compartments for the respective plurality of switches, the raised domes defining a first set of switch activating means aligned with and extending through the window above the front outer surface of the front panel in a switch activation area of the front panel; and a first back plate secured to the rear inner surface of the front panel in containing relationship to the unitary switching module and forming a first hollow compartment for the unitary switching module in the switch activation area wherein each switch is activated by depression of its respective raised dome on the front plate of the unitary switching module.

2. The air bag cover as claimed in claim 1 further comprising a plurality of rearwardly extending stakes formed on the rear inner surface of the front panel wherein the back plate has an attachment portion including a corresponding plurality of apertures formed therethrough for receiving and retaining the stakes therein.

3. The air bag cover as claimed in claim 1 wherein at least one of the raised domes includes an integrally formed plunger extending toward its respective switch.

4. The air bag cover as claimed in claim 1 further comprising a membrane-type horn switch lying behind the rear inner surface in a horn switch activation area of the front panel and a second back plate secured to the rear inner surface of the front panel in containing relationship to the membrane-type horn switch and forming a second hollow compartment for the membrane-type horn switch in the horn switch activation area.

5. The air bag cover as claimed in claim 4 further comprising first means for coupling the membrane-type horn switch and the unitary switching module together.

6. The air bag cover as claimed in claim 5 wherein the first means for coupling is separable upon deployment of the air bag.

7. The air bag cover as claimed in claim 4 further comprising second means for coupling the first and second back plates together.

8. The air bag cover as claimed in claim 7 wherein said second means for coupling is separable upon deployment of the air bag.

9. The air bag cover as claimed in claim 1 wherein at least one of the raised domes includes first visually perceptible indicia formed on an outer surface thereof related to one of the electrical accessories.

10. The air bag cover as claimed in claim 1 wherein the plurality of hollow compartments are sealed.

* * * * *